(12) United States Patent
Reiners et al.

(10) Patent No.: US 9,853,315 B2
(45) Date of Patent: Dec. 26, 2017

(54) FUEL CELL SYSTEM AND CORRESPONDING OPERATING PROCESS

(75) Inventors: Karsten Reiners, Esslingen (DE); Sven Wenzel, Aachen (DE)

(73) Assignee: Eberspächer Climate Control Systems GmbH & Co. KG, Esslingen (DE)

(*) Notice: Subject to any disclaimer, the term of this patent is extended or adjusted under 35 U.S.C. 154(b) by 1587 days.

(21) Appl. No.: 13/435,664

(22) Filed: Mar. 30, 2012

(65) Prior Publication Data

US 2012/0251902 A1 Oct. 4, 2012

(30) Foreign Application Priority Data

Mar. 31, 2011 (DE) .................. 10 2011 006 531

(51) Int. Cl.
*H01M 8/04* (2016.01)
*H01M 8/04828* (2016.01)
*H01M 8/0612* (2016.01)
*H01M 8/0432* (2016.01)

(52) U.S. Cl.
CPC ... *H01M 8/04835* (2013.01); *H01M 8/04373* (2013.01); *H01M 8/0618* (2013.01)

(58) Field of Classification Search
CPC ...................................................... H01M 8/04
See application file for complete search history.

(56) References Cited

U.S. PATENT DOCUMENTS

| | | | |
|---|---|---|---|
| 2004/0106019 A1 | 6/2004 | Halliop et al. | |
| 2009/0305097 A1* | 12/2009 | Kaupert | 429/19 |
| 2010/0221622 A1* | 9/2010 | Dan | 429/423 |
| 2011/0014529 A1* | 1/2011 | Luo | H01M 8/04007 429/412 |
| 2011/0300460 A1* | 12/2011 | Barnard | H01M 8/04014 429/427 |

\* cited by examiner

*Primary Examiner* — Jacob Marks
(74) *Attorney, Agent, or Firm* — McGlew and Tuttle, P.C.

(57) ABSTRACT

A fuel cell system (1), especially for motor vehicles, is provided with at least one fuel cell (2), which has at least two electrodes (3), to which at least one electric user (4) can be connected. The electrodes (3), especially the anode (4), are protected if a temperature-measuring device (8) measures the electrode temperature of at least one of the electrodes (3) and if a control (24) sets the water fed into the fuel cell (2) by a water feed device (11), preferably before the reformate gas enters the fuel cell (2), as a function of the measured electrode temperature.

20 Claims, 2 Drawing Sheets

FUEL CELL SYSTEM AND CORRESPONDING OPERATING PROCESS

CROSS REFERENCE TO RELATED APPLICATIONS

This application claims the benefit of priority under 35 U.S.C. §119 of German Patent Application DE 10 2011 006 531.8 filed Mar. 31, 2011, the entire contents of which are incorporated herein by reference.

FIELD OF THE INVENTION

The present invention pertains to a fuel cell system, especially of a motor vehicle. The present invention pertains, furthermore, to a process for operating such a fuel cell system.

BACKGROUND OF THE INVENTION

A fuel cell system usually has at least one fuel cell, which comprises at least two electrodes and an electrolyte. The two electrodes are called anode and cathode according to their functions and are separated by the electrolyte. The significance of fuel cells is that they convert chemical energy released as water into electric energy during the chemical reaction of hydrogen and oxygen. This electric energy can then be used by a user in the form of electric current for energy supply or stored. Mainly water is formed as a waste product by the chemical reactions, which lead to a function of the fuel cell. This fact makes fuel cells into an environmentally friendly type of energy generation. The educts for supplying the fuel cell are called cathode gas and anode gas, respectively, according to the respective electrodes to which they are fed. Air or a gas containing oxygen is usually used as cathode gas. The anode gas is usually hydrogen or a gas that contains hydrogen and can be obtained, for example, by means of a reformer from hydrocarbons before it is fed to the anode as anode gas in the form of a reformate gas. High-temperature fuel cells, such as solid oxide fuel cells (SOFC from the English Solid oxide fuel cell), usually have an operating temperature of a few hundred degrees Celsius. The fuel cell must therefore be brought to a corresponding temperature until the above chemical reactions start and the fuel cell delivers electric energy.

SUMMARY OF THE INVENTION

An object of the present invention is to provide for a fuel cell system with an improved or at least alternative embodiment, which is characterized especially by simplified handling.

The present invention is based on the general idea of providing in a fuel cell system of the type mentioned in the introduction a temperature-measuring device, which measures an electrode temperature of at least one of the electrodes, and of using a control such that it sets a quantity of water fed to the reformate gas, preferably before entry into the fuel cell, depending on the measured electrode temperature. The control consequently sets a quantity of water, which is added to the reformate gas, especially depending on the electrode temperature.

The reformate gas has a carbon formation limit temperature, below which carbon is formed from the reformate gas. If the reformate gas in this case reaches a surface that has a surface temperature that is lower than the carbon formation limit temperature, this leads especially to the formation of carbon on this surface. In case of fuel cells, the reformate gas is fed to an anode. If an anode temperature is lower than the carbon formation limit temperature, this leads to the formation of carbon on the anode surface. The consequence is especially a reduction in the performance of the anode, which may increase to the extent that the anode will become entirely unfit for use. The present invention now utilizes the discovery that the carbon formation limit temperature can be lowered over broad temperature ranges, especially by adding water to the reformate gas. If it is possible to consistently maintain the carbon formation limit temperature below the anode temperature, the formation of carbon on the anode is interrupted or at least reduced. The variation of the quantity of water fed to the reformate gas before contact with the anode, which variation depends on the electrode temperature, especially the anode temperature, is therefore a useful and simple way of preventing carbon formation on the anode. This is very useful especially during the start-up of a fuel cell, because the electrodes have an especially low electrode temperature here and the contact with the markedly hotter reformate gas leads to intense carbon formation on the corresponding electrode. As an alternative, water may be fed to the reformate gas in order to eliminate carbon deposits possibly present on the anode.

Corresponding to an advantageous embodiment, the control can thus be designed and programmed such that it feeds a quantity of water to the reformate gas depending on the measured electrode temperature such that the resulting carbon formation limit temperature of the reformate gas will be below the electrode temperature, whereby especially the formation of carbon on the corresponding electrode is prevented or at least reduced. This can be embodied especially by the control setting the quantity of water corresponding to characteristics or characteristic diagrams associated with the measured electrode temperature.

The control is coupled by a connection with the temperature-measuring device corresponding to a possible embodiment of the solution according to the present invention. The control has, furthermore, a connection with the water feed means. The quantity of water fed to the reformate gas by the water feed means is varied now by the control depending on the measured electrode temperature. This can be achieved especially by varying the capacity of the water feed means, for example, a delivery means. For example, a pump, whose capacity is set by the control, may be used as the delivery means. The variation of the quantity of water fed to the reformate gas is used now especially to avoid or at least reduce carbon formation on the anode, especially during the start-up of a fuel cell, by reducing the carbon formation limit temperature. As an alternative, water is fed to the reformate gas independently from the measured electrode temperature especially in order to eliminate carbon deposits on the corresponding electrode.

It shall be pointed out that the connections between the control and the water feed means or the temperature-measuring device as well as with the feed means mentioned below and the delivery means thereof do not necessarily consist of an electric conductor. In particular, wireless connections for transmitting the corresponding signals are conceivable as well. This also applies to connections between controls if there are a plurality of controls. It shall, furthermore, be mentioned that the individual connections may also have a return channel, especially for polling the values of the individual components of the fuel cell system and for balancing these.

In another embodiment, the water feed means has a water container. Especially a water tank or a pressurized container is used as the water container, with the control correspondingly changing the capacity of the delivery means, e.g., a pump, depending on the measured electrode temperature in order to vary the quantity of water fed to the reformate gas.

In another embodiment, the fuel cell system additionally has a residual gas burner for burning anode waste gas and cathode waste gas. The residual gas burner has, furthermore, a burner waste gas line, which is connected to a cathode gas feed line in a heat-transmitting manner. The heat transmission may be embodied especially by a heat exchanger. The cathode gas thus heated is used to heat the respective cathode especially during the start-up of the fuel cell.

It shall be noted that water fed to the reformate gas may be in any state of aggregation. Consequently, it may be especially steam or liquid water. In case of steam, the water container may have especially an overpressure, with the control actuating a corresponding valve of the water feed means in order to vary the quantity of water fed to the reformate gas. Furthermore, other water-containing liquids or gases can lead to the same result, reference being made especially to the return of the anode waste gas to the reformate gas. Such embodiments therefore also fall within the scope of the present invention.

The quantity of water fed to the reformate gas may depend on a reformate gas volume flow in another advantageous embodiment. This shall serve especially the purpose of guaranteeing a percentage of water in the reformate gas for any desired reformate gas volume flow. A corresponding adaptation of the quantity of water can be embodied especially by means of suitable characteristics or characteristic diagrams or optionally by complementing the characteristics or characteristic diagrams already available. The control now changes the quantity of water fed to the reformate gas as a function of the reformate gas volume flow and/or the measured electrode temperature.

In another embodiment of the solution according to the present invention, water may optionally be fed to the reformate gas only when the measured electrode temperature is above a preset minimum electrode temperature. The above-described changes in the quantity of water fed to the reformate gas are consequently made only when the measured electrode temperature is above the minimum electrode temperature. The minimum electrode temperature may in this case correspond especially to a minimum carbon formation limit temperature, below which a further reduction of the carbon formation limit temperature by feeding water to the reformate gas is no longer possible. The control correspondingly stops the water being fed to the reformate gas when the measured electrode temperature is below the minimum electrode temperature.

A preset maximum electrode temperature may be correspondingly taken account alternatively or in addition in another embodiment, in which case water is fed to the reformate gas only when the measured electrode temperature is below the maximum electrode temperature. The above-described changes in the quantity of water fed to the reformate gas consequently take place only if the measured electrode temperature is below the maximum electrode temperature. The maximum electrode temperature may correspond in this case especially to a temperature of the electrode that is higher than the carbon formation limit temperature of the reformate gas without the addition of water. The control correspondingly feeds no water to the reformate gas if the measured electrode temperature is above the maximum electrode temperature.

In another advantageous embodiment, a quantity of fuel fed to the reformer and/or a quantity of oxidant gas fed to the reformer is set depending on the measured electrode temperature. The above-mentioned control or another control is correspondingly designed and programmed such that it sets the quantity of fuel and/or the quantity of oxidant gas individually or together depending on the measured electrode temperature. This may be embodied especially by corresponding characteristics or characteristic diagrams or optionally by complementing the characteristics or characteristic diagrams already present, which allot a certain quantity of fuel and/or a quantity of oxidant gas to the measured electrode temperature, the control taking into account the corresponding characteristics. These characteristics or characteristic diagrams may serve especially the purpose of allotting a fuel-to-oxidant gas ratio to the measured electrode temperature. The fuel-oxidant gas ratio allotted to the measured electrode temperature may in this case serve especially the purpose of maintaining a carbon formation limit temperature of the reformate gas below measured electrode temperature.

Corresponding to another embodiment, a quantity of anode waste gas returned to the reformer and/or the reformate gas may take place as a function of the measured electrode temperature. One of the above-mentioned controls or another control is correspondingly designed and programmed such that it sets the quantity of anode waste gas that is fed to the reformer and/or reformate gas as a function of the measured electrode temperature. This can be achieved especially by corresponding characteristics or characteristic diagrams or by complementing the existing characteristics or characteristic diagrams. The return of the anode waste gas to the reformer and/or to the reformate gas may serve, for example, the purpose of maintaining the carbon formation limit temperature of the reformate gas, especially by water possibly present in the anode waste gas, below the measured electrode temperature.

A conversion (conversion rate or degree of conversion of cathode and anode gas-conversion rate of fuel and/or oxidant gas) of at least one of the fuel cells can be taken into account in addition or optionally during the above-mentioned changes in the quantity of water fed to the reformate gas and/or the quantity of fuel fed to the reformer and/or the quantity of oxidant gas fed to the reformer and/or the quantity of anode waste gas fed to the reformate gas. This can be embodied especially by corresponding characteristics or characteristic diagrams or by adapting the existing characteristics or characteristic diagrams. The taking into account of the conversion may serve especially the purpose of taking into account the quantity of water in the anode waste gas, which is returned to the reformer and/or reformate gas.

The above-mentioned changes may take place in the respective embodiments individually or together or in any desired combination in a continuous or stepped manner. In case of a stepped change, the corresponding step may be preset especially by the corresponding characteristics or characteristic diagrams. The changes may take place, furthermore, each independently from one another or depending on one another or in any desired combination independently or dependently. It is obvious that the individual changes do affect the carbon formation limit temperature and hence correspondingly the other variable parameters, which is taken correspondingly into account.

It shall be pointed out that the determination of the electrode temperature by the temperature-measuring device does not necessarily have to take place directly at the respective electrode. Temperature determinations at any desired other sites are also conceivable, if the corresponding electrode temperature can be inferred from them. The temperature measurement may also take place especially in a contactless manner.

It is apparent that the above-mentioned features, which will also be explained below, can be applied not only in the particular combination given, but in other combinations or alone as well, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
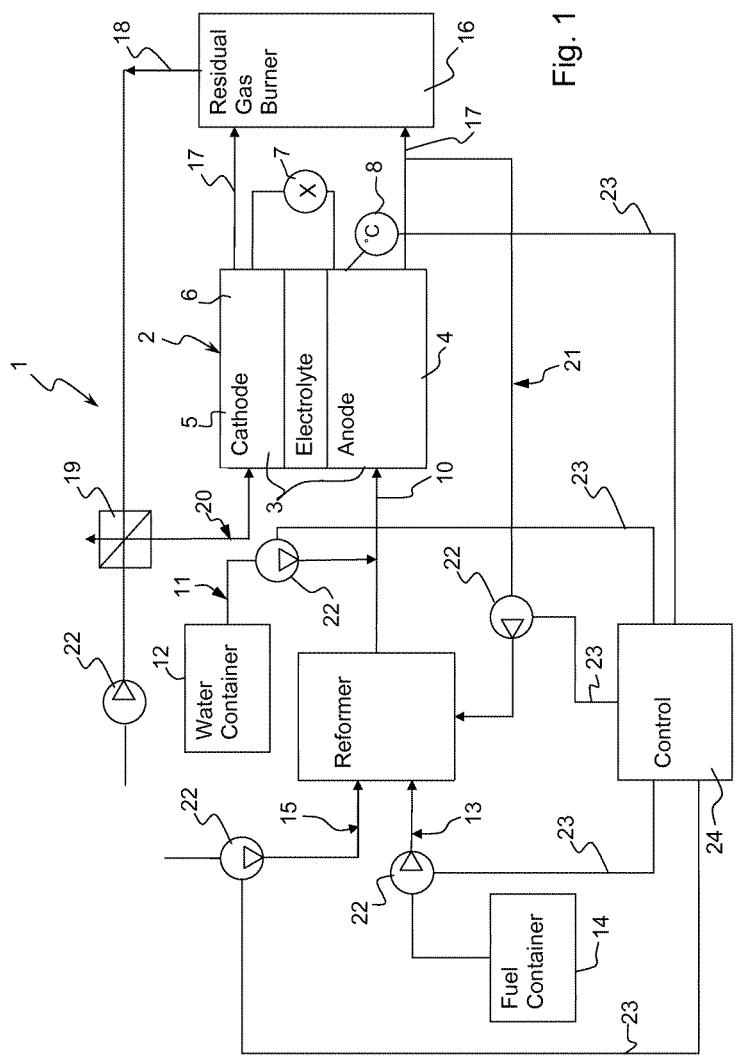
FIG. 1 is a highly simplified schematic circuit diagram of a fuel cell system according to the present invention.

Referring to the drawings in particular, according to FIG. 1, a fuel cell system 1 comprises at least one fuel cell 2, which has at least two electrodes 3, namely, an anode 4 and a cathode 5, which are separated by an electrolyte 6. An electric user 7 is connected to the electrodes 3. The fuel cell system 1 has, furthermore, a temperature-measuring device 8, which is designed such that it can measure an electrode temperature of at least one of the electrodes 3, here an anode temperature of anode 4. The fuel cell system 1 has a reformer 9 for supplying the fuel cell 2 with reformate gas. The reformate gas is fed by a reformate gas line 10 to the anode 4 of fuel cell 2. A water feed means 11 has a water container 12 and is connected to the reformate gas line 10 between reformer 9 and anode 4 such that the water feed means 11 can feed water to the reformate gas before entering the fuel cell 2. The fuel cell system 1 has a fuel feed means 13 for supplying reformer 9 with a fuel, which means comprises a fuel container 14. The fuel cell system 1 has, furthermore, an oxidant gas feed means 15 for supplying the reformer 9 with an oxidant gas. The fuel cell system 1 being shown here comprises, in addition, a residual gas burner 16 for burning anode waste gas and cathode waste gas, wherein this waste gases are fed to the residual gas burner 16 through waste gas lines 17. Residual gas burner 16 has a burner waste gas line 18, which is connected to a cathode gas feed means 20 in a heat-coupling manner, for example, by a heat exchanger 19. Fuel cell system 1 has, furthermore, a recirculating means 21 for returning the anode waste gas to reformer 9, wherein the recirculating means returns anode waste gas from the corresponding waste gas line 17 to reformer 9. Water feed means 11, fuel feed means 13, oxidant gas feed means 15, cathode gas feed means 20 and recirculating means 21 have each a delivery means 22, which is coupled with control 24 by connections 23. Control 24 is connected, moreover, to the temperature-measuring means 8 by a connection 23.

Control 24 is equipped and programmed such that depending on the anode temperature of anode 4, which is measured by means of temperature-measuring device 8, it varies a quantity of water that is fed to the reformate gas before the reformate gas enters fuel cell 2. This can be embodied especially by varying the capacity of delivery means 22 of water feed means 11. In addition or as an alternative, control 24 is programmed and designed such that it is able to vary a quantity of oxidant gas fed to reformer 9 as a function of the anode temperature of anode 4 measured by means of temperature-measuring device 8. This can be implemented especially by varying the delivery capacity of the corresponding delivery means 22 of fuel feed means 13 and oxidant gas feed means 15. Due to a corresponding programming and equipping, control 24 is able, moreover, to vary a quantity of anode waste gas returned to reformer 9 depending on the anode temperature of anode 4 determined by temperature-measuring device 8. This change can be embodied especially by changing the capacity of delivery means 22 of recirculating means 21. The individual changes and variations of the corresponding capacities of the delivery means 22 and hence the respective quantities of water fed, fuel fed, oxidant gas fed and anode waste gas fed may take place independently from one another or depending on one another. The delivery means 22 may, furthermore, be actuated individually or together or in any desired combination.

Figure 2:
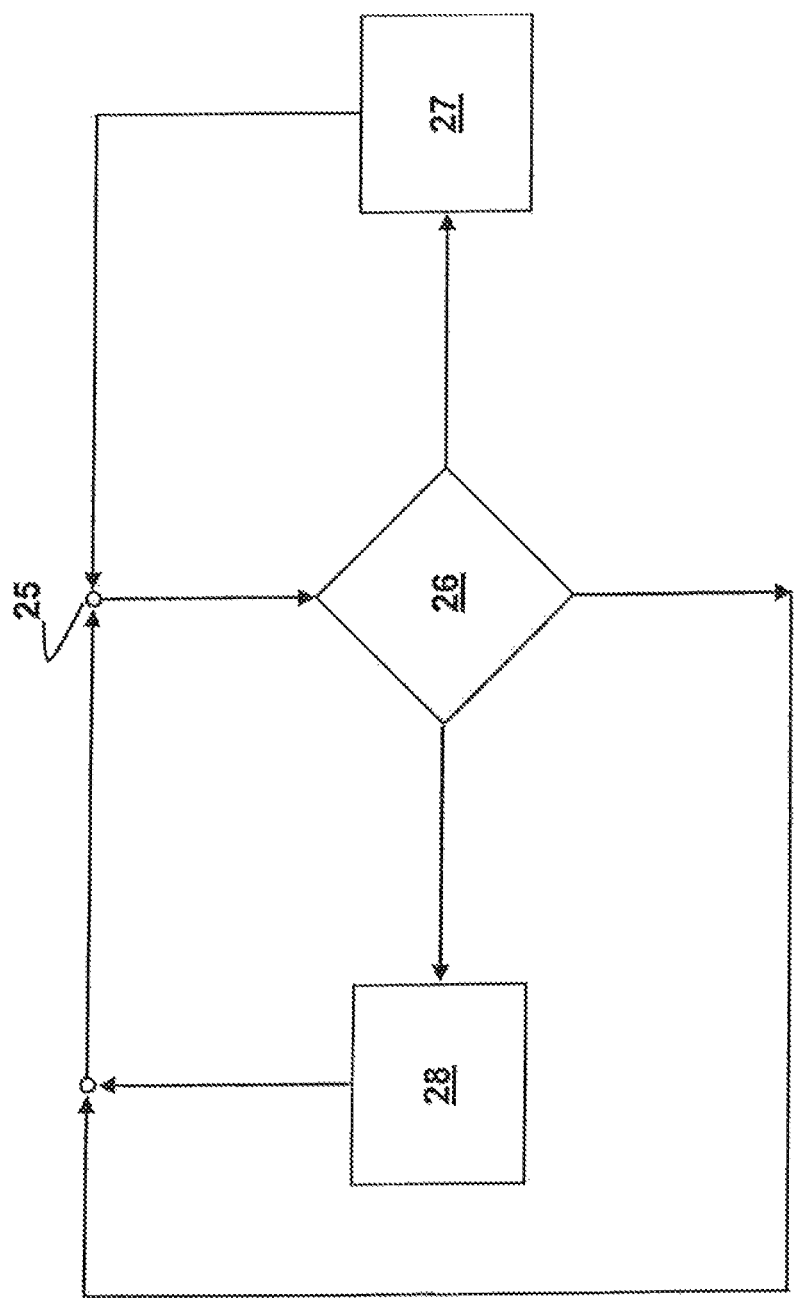
FIG. 2 is a flow chart to explain an operating process according to the present invention.

Corresponding to an advantageous embodiment, control 24 may be programmed such that it can embody the operating process described below on the basis of FIG. 2.

Starting from a starting point 25, the process checks in a comparison section 26 the anode temperature of anode 4 measured by the temperature-measuring device 8. If a reduction of the anode temperature is detected compared to the anode temperature measured last, the quantity of water fed to the reformate gas is increased during an operation 27. The process then returns to starting point 25 and the process is repeated. However, if an increase in the anode temperature of anode 4 is detected compared to the anode temperature measured last during comparison section 26, the quantity of water fed to the reformate gas is reduced during an operation 28 and the process subsequently returns to starting point 25, after which the process is repeated. In case of an unchanged anode temperature of anode 4 in comparison section 26, the process returns to starting point 25 and the process is repeated. The change in the quantity of water fed to the reformate gas can in this case serve especially the purpose of lowering a carbon formation limit temperature of the reformate gas, below which carbon is formed from the reformate gas, to the extent that it is below the anode temperature.

The quantity of water fed to the reformate gas may also depend, in particular, on the reformate gas volume flow. The quantity of water fed to the reformate gas is, as a rule, increased or reduced with the reformer gas volume flow. This is used especially to take into account a ratio of reformate gas to water in order to maintain the carbon formation limit temperature of the reformate gas below the anode temperature.

The process may take into account, moreover, a minimum anode temperature of anode 4, wherein water is fed to the reformate gas only when the measured anode temperature is above the minimum anode temperature. This may be used especially to take into account a minimum carbon formation limit temperature, below which a further reduction of the carbon formation limit temperature by feeding water is not possible. As an alternative or in addition, the process can take into account the maximum anode temperature of anode 4, wherein water is fed to the reformate gas only when the measured anode temperature is below the maximum anode temperature. This may serve especially the purpose of taking into account the anode temperatures that are above the carbon formation limit temperature of the reformate gas without water feed.

As an alternative to the above-mentioned process for changing the quantity of water fed to the reformate gas as a function of the anode temperature and/or the reformate gas volume flow, a process in which a proportionate quantity of water relative to the quantity of reformate gas is allotted to each anode temperature range is advantageous. This can be embodied especially by characteristics or characteristic diagrams stored in control 24. Control 24 in this case changes the quantity of water fed to the reformate gas corresponding to the values stored in the characteristics or characteristic diagrams. These stored values may serve especially the purpose of maintaining the carbon formation limit temperature of the reformate gas below the measured anode temperature. The values may depend, furthermore, individually or together on the anode temperature and/or the reformate gas volume flow. The values may, furthermore, also depend on the parameters mentioned below, each individually or together or in any desired combination.

Corresponding to the process, a quantity of fuel fed to the reformer 9 and/or a quantity of oxidant gas fed to the reformer 9 can be varied, in addition or as an alternative, as a function of the measured anode temperature in operations 27 and 28. These steps may be optionally carried out during the operations following the operations 27 and 28. A corresponding statement applies to the variant of the process in which the anode temperature range and the respective characteristics or characteristic diagrams are taken into account. Controlling the quantity of fuel fed to reformer 9 and/or the quantity of oxidant gas fed to reformer 9 as a function of the measured anode temperature of anode 4 may serve especially the purpose of maintaining the carbon formation limit temperature of the reformate gas below the measured anode temperature. For example, a corresponding fuel-to-oxidant gas ratio can be allotted to an anode temperature of anode 4, especially in the form of said characteristics and characteristic diagrams, and such a ratio is set in the corresponding operations.

In an alternative form of the process, control 24 additionally varies the return of anode waste gas to the reformer. Control 24 in this case changes a quantity of anode waste gas returned to the reformer as a function of the measured anode temperature of anode 4. This can be used to maintain the carbon formation limit temperature below the measured anode temperature, especially by water possibly present in the anode waste gas.

It shall be pointed out that the process variants described here as examples may have, as an alternative or in addition, depending on the anode temperature of anode 4, a dependence on the cathode temperature of a cathode 5, without going beyond the scope of the present invention.

While specific embodiments of the invention have been shown and described in detail to illustrate the application of the principles of the invention, it will be understood that the invention may be embodied otherwise without departing from such principles.

What is claimed is:

1. A fuel cell system comprising:
   at least one fuel cell, which has at least two electrodes for connecting at least one electric user;
   at least one temperature-measuring device for measuring an electrode temperature, which is correlated with a temperature at at least one of said electrodes or corresponds to the temperature at said at least one of said electrodes;
   at least one reformer for generating a reformate gas for supplying the fuel cell;
   at least one water feed means for feeding water to the reformate gas, between said reformer and said fuel cell; and
   a controller comprising a control setting programmed to set a quantity of water fed to the reformate gas as a function of the measured electrode temperature.

2. A fuel cell system in accordance with claim 1, further comprising:
   at least one residual gas burner for burning anode waste gas and cathode waste gas, wherein said residual gas burner has a burner waste gas line, which is coupled with a cathode gas feed means for supplying the fuel cell with cathode gas in a heat-transmitting manner.

3. A fuel cell system in accordance with claim 1, wherein said control is designed and/or programmed for the steps of controlling a quantity of fuel fed to the reformer and/or a quantity of oxidant gas fed to the reformer depending on at least one of:
   the measured electrode temperature;
   the conversion of fuel and/or oxidant gas at the fuel cell; and
   such that a carbon formation limit temperature of the reformate gas is below the measured electrode temperature.

4. A motor vehicle fuel cell system comprising:
   a fuel cell comprising two electrodes with a motor vehicle user electrical connection;
   a temperature-measuring device for measuring an electrode temperature, which electrode temperature is correlated with a temperature at one of said electrodes or corresponds to the temperature at said one of said electrodes;
   a reformer for generating a reformate gas for supplying the fuel cell;
   a water feed feeding water to the reformate gas, between said reformer and said fuel cell; and
   a controller comprising a control setting programmed to set a quantity of water fed to the reformate gas as a function of the measured electrode temperature.

5. A motor vehicle fuel cell system in accordance with claim 4, wherein said control sets the quantity of water fed to the reformate gas depending on at least one of:
   a reformate gas volume flow;
   a conversion of fuel and/or oxidant gas at the fuel cell; and
   a carbon formation limit temperature of the reformate gas being below the measured electrode temperature.

6. A motor vehicle fuel cell system in accordance with claim 4, wherein said control sets a quantity of fuel fed to the reformer and/or a quantity of oxidant gas fed to the reformer depending on the measured electrode temperature.

7. A motor vehicle fuel cell system in accordance with claim 6, wherein the quantity of water fed to the reformate gas and/or the quantity of fuel fed to the reformer and/or the quantity of oxidant gas fed to the reformer is set depending on the conversion of fuel and/or oxidant gas at the fuel cell.

8. A motor vehicle fuel cell system in accordance with claim 4, wherein the water is fed to the reformate gas at least one of only above a preset minimum electrode temperature and only below a preset maximum electrode temperature.

9. A motor vehicle fuel cell system in accordance with claim 4, wherein:
water from said water feed is fed into the reformat gas downstream of said reformer.

10. A motor vehicle fuel cell system in accordance with claim 4, wherein:
said control sets the quantity of water fed to the reformate gas to a value that causes a carbon formation limit temperature of the reformat gas to be at a value below the measured electrode temperature.

11. A fuel cell system in accordance with claim 1, wherein:
water from said water feed means is fed into the reformat gas downstream of said reformer.

12. A motor vehicle fuel cell system in accordance with claim 4, wherein:
said control sets the quantity of water fed to the reformate gas to a value that causes a carbon formation limit temperature of the reformat gas to be at a value below the measured electrode temperature.

13. A fuel cell system comprising:
a fuel cell including two electrodes adapted to connect to an electrical user;
a temperature-measuring device measuring an electrode temperature, the electrode temperature being correlated with a temperature of one of said two electrodes;
a reformer connected to said fuel cell and receivable of fuel, generating a reformate gas from the fuel, and supplying the reformate fuel to said fuel cell;
a reformate gas line connecting said reformer to said fuel cell, and transporting the reformate gas from said reformer to said fuel cell;
a water feed feeding water into the reformate gas downstream of said reformer; and
a control setting configured to set a quantity of water fed to the reformate gas as a function of the measured electrode temperature.

14. A fuel cell system in accordance with claim 13, wherein:
said water feed feeding the water into the reformate gas line at a location between said reformer and said fuel cell.

15. A fuel cell system in accordance with claim 13, wherein:
said control is configured to set the quantity of water fed to the reformate gas to a value that causes a carbon formation limit temperature of the reformat gas to be at a value below the measured electrode temperature.

16. A fuel cell system in accordance with claim 13, wherein:
said control is configured to set a quantity of fuel fed to the reformer and a quantity of oxidant gas fed to the reformer to maintain a carbon formation limit temperature of the reformate gas below the measured electrode temperature.

17. A fuel cell system in accordance with claim 13, wherein:
said control is configured to set the quantity of water fed to the reformate gas and is configured to set a quantity of fuel fed to the reformer and is configured to set a quantity of oxidant gas fed to the reformer to maintain a carbon formation limit temperature of the reformate gas below the measured electrode temperature.

18. A fuel cell system in accordance with claim 13, further comprising:
a recirculating line feeding anode waste gas from said fuel cell to said reformer;
said control is configured to use a conversion rate of cathode and anode gas of said fuel cell to determine a quantity of water in the anode waste which is fed to said reformer.

19. A fuel cell system in accordance with claim 18, wherein:
said control is configured to set the quantity of water fed to the reformate gas and is configured to set a quantity of fuel fed to the reformer and is configured to set a quantity of oxidant gas fed to the reformer depending on the conversion rate of the cathode and anode gas of said fuel cell.

20. A fuel cell system in accordance with claim 15, wherein:
said control is configured to stop feeding the water to the reformate gas when the measured electrode temperature is below a minimum electrode temperature, the minimum electrode temperature being a temperature below which a further reduction of the carbon formation limit temperature by feeding water to the reformate gas is no longer possible.

* * * * *